United States Patent [19]

Abrams et al.

[11] 4,302,419
[45] Nov. 24, 1981

[54] CATALYTIC RECOMBINER SYSTEM

[75] Inventors: Richard F. Abrams, Westborough; Stuart Motew, Bolton; Robert Wojnarowski, Andover; Zygmunt Wachta, Boston, all of Mass.

[73] Assignee: Helix Technology Corporation, Waltham, Mass.

[21] Appl. No.: 121,025

[22] Filed: Feb. 13, 1980

[51] Int. Cl.³ .................... G21C 19/00; C01B 5/00
[52] U.S. Cl. .................... 422/62; 23/230 A; 422/105
[58] Field of Search .............. 422/62, 105, 119; 23/230 A

[56] References Cited

U.S. PATENT DOCUMENTS

| | | | |
|---|---|---|---|
| 3,656,911 | 4/1972 | Hobbs . | |
| 3,791,793 | 2/1974 | Friedmann | 23/230 A |
| 3,791,923 | 2/1974 | Bhan . | |
| 3,937,796 | 2/1976 | Bhan | 423/580 |

*Primary Examiner*—Ronald Serwin
*Attorney, Agent, or Firm*—Hamilton, Brook, Smith & Reynolds

[57] ABSTRACT

In a catalytic recombiner system a stoichiometric mixture of oxygen and hydrogen are carried by a nitrogen stream through a catalytic converter. The stoichiometric mix is maintained by introducing oxygen into the stream under control of logic circuitry. The logic circuitry responds to the hydrogen level in an inlet stream and to oxygen levels before and after the catalytic converter.

10 Claims, 5 Drawing Figures

H2 ANALYZER

LEAD/LAG

O2 ANALYZER

O2 FLOW CONTROL

CATALYTIC RECOMBINER SYSTEM

TECHNICAL FIELD

This invention relates to the recombination of the components of a gas mixture in a catalytic reactor and has particular application to the recombination of hydrogen and oxygen into water.

BACKGROUND ART

One form of cooling system for nuclear reactors is a pressurized water system. The water is held under pressure by nitrogen gas to prevent boiling. Dissociated hydrogen and oxygen and radioactive contaminants are then withdrawn from the pressurized system in a nitrogen stream, and the hydrogen is recombined with oxygen into the safer and more easily handled water. In such recombiner systems, oxygen is added to the gas stream in an attempt to maintain a stoichiometric mix of hydrogen and oxygen in a nitrogen gas stream. The gases are then preheated and introduced into a catalytic reactor. The hydrogen and oxygen are there recombined in an exothermic reaction to form water vapor, which, after cooling, is separated from the nitrogen gas stream. The nitrogen is delivered to delay tanks where it is held for a length of time sufficient for decay of radioactive material. Some of the nitrogen gas from the delay tanks is returned to the recombiner system to maintain a large percentage of inert nitrogen gas in the recombiner gas stream.

To assure a stoichiometric mix of the hydrogen and oxygen in such systems, a sample of the nitrogen gas in the output stream is taken to determine the amount of oxygen and hydrogen gas remaining in that stream. An oxygen supply to the nitrogen stream at the recombiner input can then be controlled to hold the hydrogen and oxygen gases at the output to a minimum.

Prior recombiner systems have not responded well to transients in the inlet stream mixture. A five to ten second response time was required and in that time a dangerously high level of either hydrogen or oxygen could occur in the outlet stream.

An object of the present invention is to provide a recombiner system which maintains a stoichiometric mixture of component gases even with transient changes in hydrogen level in an inlet gas stream. A specific object of this invention is to provide a recombiner system which is able to respond to a change of hydrogen level of four percent within one-half second.

DISCLOSURE OF THE INVENTION

In a recombiner system, components of a gas mixture are combined in a catalytic reactor. An analyzer for a first gas component, such as hydrogen, provides an indication of the amount of that component in an inlet gas stream upstream from the catalytic reactor. A gas flow passage from that analyzer to a mixing point provides a delay time T for the inlet gas stream. Electronic control circuitry responds to the first component indication to provide a control signal for a second component such as oxygen. That signal controls the second component flow into the primary gas stream at the mixing point. The time required to change the second component flow, in response to a change in the amount of first component at the gas analyzer, closely matches the delay time T.

In a preferred system, an oxygen analyzer is downstream of the mixing point. The hydrogen indication serves as a remote set point which in combination with the oxygen indication provides the oxygen control signal.

An excess of one of the components of the gas stream can be maintained at the output by analyzing the output. The second component control signal is adjusted to maintain an excess at a predetermined set point.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

BEST MODE OF CARRYING OUT THE INVENTION

Figure 1:
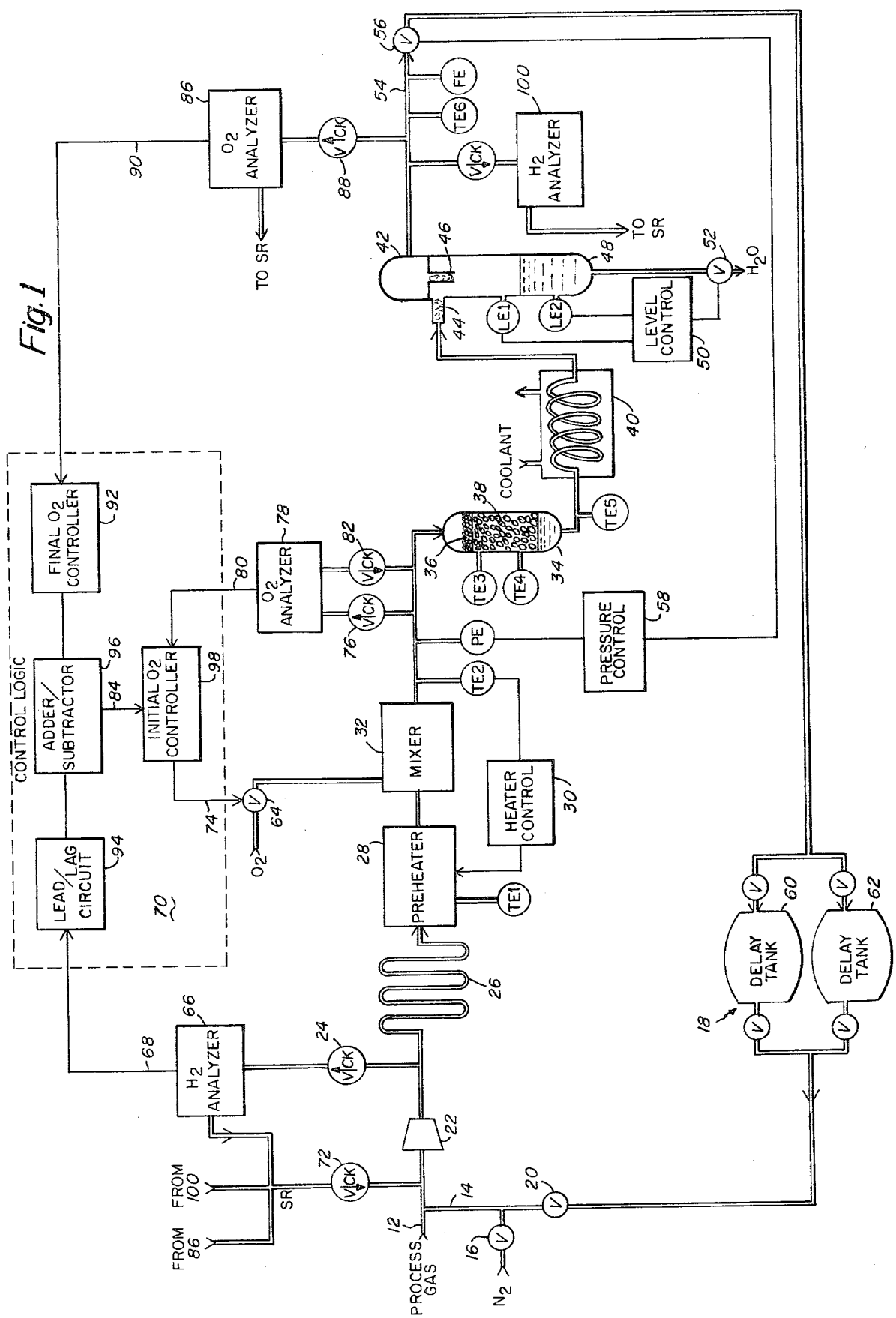
FIG. 1 is a schematic diagram of the recombiner system along with its control circuitry.

Nitrogen gas, contaminated with hydrogen and radioactive particles, is introduced into the recombiner system of FIG. 1 through an inlet line 12. The gas stream from the nuclear reactor systems on line 12 has a flow rate of less than 1.7 cubic feet per minute. The stream is mixed with 40 cubic feet per minute of nitrogen from line 14 to assure that less than 4% hydrogen is contained in the combined inlet stream. During startup, the nitrogen in line 14 is provided by a nitrogen source through valve 16. However, once one of the delay tanks 18 has been sufficiently filled with nitrogen, some nitrogen is recirculated from the tanks through a valve 20.

The combined inlet stream is then compressed from about atmospheric pressure to 85 pounds per square inch gauge (psig) in a compressor 22. A sample of the compressed gas is taken through a check valve 24; but the primary gas stream continues through a delay line 26 to a preheater 28. The gas is there preheated to 200° F. under control of heater control 30. Control 30 responds to a temperature sensed downstream at temperature element TE2.

A controlled amount of pure oxygen is added to the primary gas stream in a mixer 32 to achieve a stoichiometric mixture of hydrogen and oxygen in the gas stream. The preheated stoichiometric mixture carried by the nitrogen gas stream then passes through a catalytic reactor 36. In the reactor, iodine is first removed from the gas by silver zeolite beads 36. The beads provide a permeable layer in which the iodine is converted to silver iodide. In the preferred embodiment, two inches of CTI Nuclear, type III silver zeolite beads are used. These beads prevent catalyst poisoning by the iodine and also assure that the iodine will not reach the environment.

Once cleaned of iodine, the gas stream passes through the catalyst beads 38. The beads are a precious metal catalyst coated on a pelletized ceramic carrier such as the standard recombiner catalyst sold by Oxy-Catalyst Company. A 20 inch layer of catalyst is provided in the 6 inch diameter tank. The resulting exothermic reaction between the hydrogen and oxygen produces water vapor with an accompanying temperature rise to 730° F.

The hot gas from the catalytic reactor 34 is cooled by water in a cooler/condenser 40 to about 120° F. The condensed water is then removed from the gas stream in a moisture separator 42. The moisture separator includes a wire mesh coalescer 44 such as that sold by Metex Company. The nitrogen continues through a mesh mist eliminator 46, also available from Metex Company, and water collects in a 5 gallon accumulator 48. The water is drained through a valve 52 by level control 50 which responds to two level sensing elements LE1 and LE2. The radioactive contaminated water is then collected and further treated.

The nitrogen gas, cleaned of hydrogen and with a low level of oxygen is passed through a valve 56 to the delay tanks 18. The gas flow through valve 56 is controlled by pressure control 58 which responds to the gas pressure at pressure sensing element PE. A sufficient back pressure in the system is thereby maintained.

The cleaned nitrogen is directed through suitable valves to delay tank 60 until that tank is filled. Then the gas is diverted to a second tank 62. Similarly other tanks may be provided. The gas remains in the tank for a sufficient time for the radioactive material therein to decay to acceptable levels.

As already noted, it is important that the stoichiometric mix be maintained notwithstanding transient changes in hydrogen concentration in the input line 12. To that end, a control system is provided to meter in the proper amount of oxygen through valve 64 into the mixer 62. A sample of gas at the inlet is taken through a check valve 24 to a hydrogen analyzer 66. With a delay of several seconds, the analyzer provides an indication of the percentage of hydrogen in the gas stream on lead 68 to a control-logic assembly 70. The gas sample is returned through a valve 72 to the primary gas stream ahead of the compressor 22. The hydrogen analyzer 66 may be a Teledyne model 225 analyzer.

In response to the hydrogen indication on line 68, the control logic provides a second component control signal on lines 84 and 74 to control the flow of oxygen through valve 64 to the mixer 32.

Because the hydrogen analyzer may require up to 11 seconds to provide an output, the sensed gas might pass the mixing point before the oxygen control signal on line 74 could be changed. The system would not be responsive to quick transients. A delay line 26 is thus provided to slow the arrival of the sampled stream at the mixer 32. In this case, the delay line 26 is a 21 foot length of 3 inch inner diameter pipe layed in a serpentine fashion; but the delay line might assume any configuration. The delay time T required for the gas stream to flow from the sampling junction at valve 24 to the mixer 32 must closely match the time required to analyze the gas and deliver the proper amount of oxygen through the valve 64 to the mixer 32. In the present system, that time is a bit greater than 11 seconds and the delay of the control signal through the control logic 70 can be readily adjusted to match the gas delay time T.

Downstream of the mixer 32 a second sample is extracted from the primary gas stream through a check valve 76 to an $O_2$ analyzer 78. The sample is returned to the gas stream through valves 82. The $O_2$ analyzer provides an indication on lead 80 of the percentage of oxygen which has been delivered to the gas stream. The oxygen indication on lead 80 is compared with the hydrogen indication on line 84 by the initial oxygen controller 98, to determine the error. The controller adjusts the oxygen control signal 74 in the direction to reduce the error toward zero, the hydrogen indication serving as a remote set point for the oxygen control.

Figure 2A:
FIG. 2A-2D is a timing diagram illustrating the response of the system to changes in hydrogen concentration from 0 to 4% and from 4% to 0, each in one-half second.

The hydrogen indicating signal on line 68 is shown in FIG. 2A. The signal does not match the sharp actual change in hydrogen noted in the broken lines in FIG. 2A. Also, the oxygen analyzer 78, requires approximately six seconds to respond. For these two reasons, the signal is compensated by a lead/lag module in the direction to boost or exaggerate changes in the hydrogen indicating signal as shown at 2B.

Figure 2B:
Figure 2C:
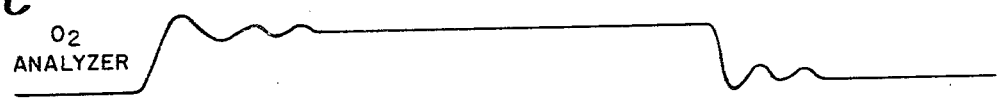
Figure 2D:

Because the signal on line 90 tends to remain at the set point determined by controller 92, the signal of FIG. 2B is passed through the adder/subtracter 96 to the initial $O_2$ controller 98 to change the set point of the controller. The initial $O_2$ controller responds to the differences in the $O_2$ signal (FIG. 2C) and its new set point to provide a signal shown in FIG. 2D. The signal of FIG. 2D changes the flow through valve 64. The change is made in the direction necessary to reduce the difference in the signals FIG. 2B and 2C, that is to reduce the error.

Preferably, the lead lag circuit 94 is a type TL-0176 Fisher lead/lag module, the adder/subtracter 96 is a type TL-173 Fisher adder/subtracter; and the initial and final $O_2$ controllers 98 and 92 are type TL-101 Fisher process controllers.

A final input to the control logic is made from an oxygen analyzer 86 which receives a sample of the output gas stream on line 54 through a valve 88. The signal line 90 indicates an excess of oxygen in the output line which, with proper operation of the system, should equal a set point established in the final oxygen controller 92 in the control logic. The sample is returned to the sample return valve 72 at the inlet.

For monitoring, and where necessary for shut down of the system, sensing elements including temperature elements TE, pressure elements PE, and flow elements FE are provided in the system. In addition, a hydrogen analyzer 100 is provided off the output line 54 to assure that the hydrogen contents at the output of the system is held to zero.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. In a recombiner system in which first and second components of a gas mixture are combined in a reactor, the improvement comprising:
   a first component gas analyzer for providing an indication of the amount of said first component in an inlet gas stream upstream from the reactor;
   a gas flow passage from the first component gas analyzer to a downstream mixing point where an amount of said second component is introduced into the gas stream, the gas flow passage providing a delay time T for the gas stream;
   electronic control circuitry responsive to the first component indication to provide a second component signal indicative of the amount of said second component which must be introduced into the gas stream to provide a predetermined ratio of the first and second components; and second component flow rate control means responsive to the second component control signal for introducing a second component gas flow into the gas stream at the mixing point, the time required to change the second component flow in response to a change in the first component at the gas analyzer closely matching the delay time T.

2. The improvement in a recombiner system as claimed in claim 1 further comprising a second component gas analyzer for providing an indication of the amount of the second component in the gas stream, the first component indication serving as a remote set point for the second component indication in the electronic control circuitry.

3. The improvement in a recombiner system as claimed in claim 2 wherein the second component gas analyzer is downstream of the mixing point.

4. The improvement in a recombiner system as claimed in claim 1, 2 or 3 further comprising an excess component analyzer for providing an indication of one of the gas components in an outlet stream from the catalytic reactor, the electronic control circuitry providing a second component control signal to maintain the excess indication at a predetermined set point.

5. The improvement in a recombiner system as claimed in claim 4 wherein the first component is hydrogen, the second component is oxygen and the excess component is oxygen.

6. The improvement in a recombiner system as claimed in claims 1, 2 or 3 wherein the first component is hydrogen and the second component is oxygen.

7. The improvement in a recombiner system as claimed in claim 6 further comprising a moisture separator in the output stream for removing water from the gas stream.

8. The improvement in a recombiner system as claimed in claim 6 further comprising, in the catalytic reactor, a permeable layer of silver zeolite upstream of the catalyst.

9. The improvement in a recombiner system as claimed in claim 1 wherein the primary component of the inlet stream is an inert gas.

10. The improvement in a recombiner system as claimed in claim 1 wherein the primary component of the inlet stream is nitrogen.

* * * * *